US012056670B2

(12) United States Patent
Chen et al.

(10) Patent No.: US 12,056,670 B2
(45) Date of Patent: Aug. 6, 2024

(54) AUTOMATED WORK TICKETING AND TRIAGE

(71) Applicant: GM Cruise Holdings LLC, San Francisco, CA (US)

(72) Inventors: Yi-Yu Chen, San Francisco, CA (US); Elisha Atkins, San Francisco, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 112 days.

(21) Appl. No.: 17/469,538

(22) Filed: Sep. 8, 2021

(65) Prior Publication Data

US 2023/0071833 A1 Mar. 9, 2023

(51) Int. Cl.
*G06Q 10/20* (2023.01)
*B60W 50/02* (2012.01)
(Continued)

(52) U.S. Cl.
CPC ......... *G06Q 10/20* (2013.01); *B60W 50/0205* (2013.01); *B60W 50/0225* (2013.01);
(Continued)

(58) Field of Classification Search
CPC .. G06Q 10/20; G06Q 10/0635; G06F 11/079; G06F 11/0748; G06F 16/9024;
(Continued)

(56) References Cited

U.S. PATENT DOCUMENTS

| 10,540,618 B2* | 1/2020 | Margherio | G05B 23/0267 |
| 2016/0225263 A1* | 8/2016 | Salentiny | G05D 1/0061 |

(Continued)

FOREIGN PATENT DOCUMENTS

| CN | 113516345 A | * | 10/2021 | |
| EP | 2718065 B1 | * | 8/2015 | B62J 99/00 |

OTHER PUBLICATIONS

Ö. Y. Astepe, et al. "Predicting "Maintenance Priority" with AI," 2021 International Conference on Electrical, Communication, and Computer Engineering (ICECCE), Kuala Lumpur, Malaysia, 2021, pp. 1-6 <https://ieeexplore.ieee.org/document/9514218?source=IQplus> (Year: 2021).*

(Continued)

*Primary Examiner* — Jerry O'Connor
*Assistant Examiner* — Michael R Koester
(74) *Attorney, Agent, or Firm* — Michael DiCato

(57) ABSTRACT

The disclosed technology provides solutions for improving work ticketing triage and in particular, for improving the triage of work orders for detected failure events (or predicted failure events) for a fleet of vehicles, such as a fleet of autonomous vehicles (AVs). In some aspects, a process of the disclosed technology can include steps for receiving field data, processing the field data to identify two or more potential failure events associated with at least one AV from among one or more AVs, and automatically generating a work order for each of the two or more potential failure events. In some aspects, the process can further include steps for calculating a dynamic priority number for each of the two or more potential failure events and sorting the work orders based on the dynamic priority. Systems and machine-readable media are also provided.

20 Claims, 7 Drawing Sheets

(51) Int. Cl.
  *B60W 60/00*    (2020.01)
  *G06N 5/04*     (2023.01)
  *G06Q 10/0631*  (2023.01)
  *G07C 5/00*     (2006.01)
  *G07C 5/08*     (2006.01)

(52) U.S. Cl.
  CPC ........... *B60W 60/0015* (2020.02); *G06N 5/04* (2013.01); *G06Q 10/06313* (2013.01); *G07C 5/006* (2013.01); *G07C 5/008* (2013.01); *G07C 5/0816* (2013.01); *B60W 2556/45* (2020.02)

(58) Field of Classification Search
  CPC .... G06F 11/0793; G06N 20/20; G06N 20/00; H04L 41/065
  See application file for complete search history.

(56) References Cited

U.S. PATENT DOCUMENTS

2022/0222983 A1* 7/2022 Vejalla ................. G07C 5/008
2022/0317676 A1* 10/2022 Reaume ............... G06Q 10/20

OTHER PUBLICATIONS

Translation of EP 2718065 B1 (Year: 2012).*

* cited by examiner

AUTOMATED WORK TICKETING AND TRIAGE

BACKGROUND

1. Technical Field

The disclosed technology provides solutions for improving work ticketing triage and in particular, for improving the triage of work orders based on machine-reported telemetry/diagnostics.

2. Introduction

Autonomous vehicles (AVs) are vehicles having computers and control systems that perform driving and navigation tasks that are conventionally performed by a human driver. As AV technologies continue to advance, they will be increasingly used to improve transportation efficiency and safety. As such, AVs will need to perform many of the functions that are conventionally performed by human drivers, such as performing navigation and routing tasks necessary to provide a safe and efficient transportation. Such tasks may require the collection and processing of large quantities of data using various sensor types, including but not limited to cameras and/or Light Detection and Ranging (LiDAR) sensors disposed on the AV.

BRIEF DESCRIPTION OF THE DRAWINGS

Certain features of the subject technology are set forth in the appended claims. However, the accompanying drawings, which are included to provide further understanding, illustrate disclosed aspects and together with the description serve to explain the principles of the subject technology. In the drawings:

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

One challenge in the ongoing maintenance of any collection of machines (e.g., fleet vehicles) is the categorization and prioritization (triage) of failure events so that repairs may be performed strategically and expeditiously. Aspects of the disclosed technology address the limitations of conventional repair workflows by providing systems and algorithms to operationalize the automatic triage of identified failure events. As disclosed herein, several of the examples of the disclosed invention are provided in the context of workflows relating to the servicing of autonomous vehicle (AV) fleets; however, it is understood that the disclosed aspects may be applied in other workflow contexts, without departing from the scope of the disclosed technology.

In some aspects, a triage process of the disclosed technology can be configured to sort work orders for specific repairs based on a calculated priority number associated with each identified failure (or potential failure) issue/event. Once dynamic priority number (DPN) scores have been calculated, work orders can be triaged (scheduled) based on the relative urgency indicated by the DPN.

Figure 1:
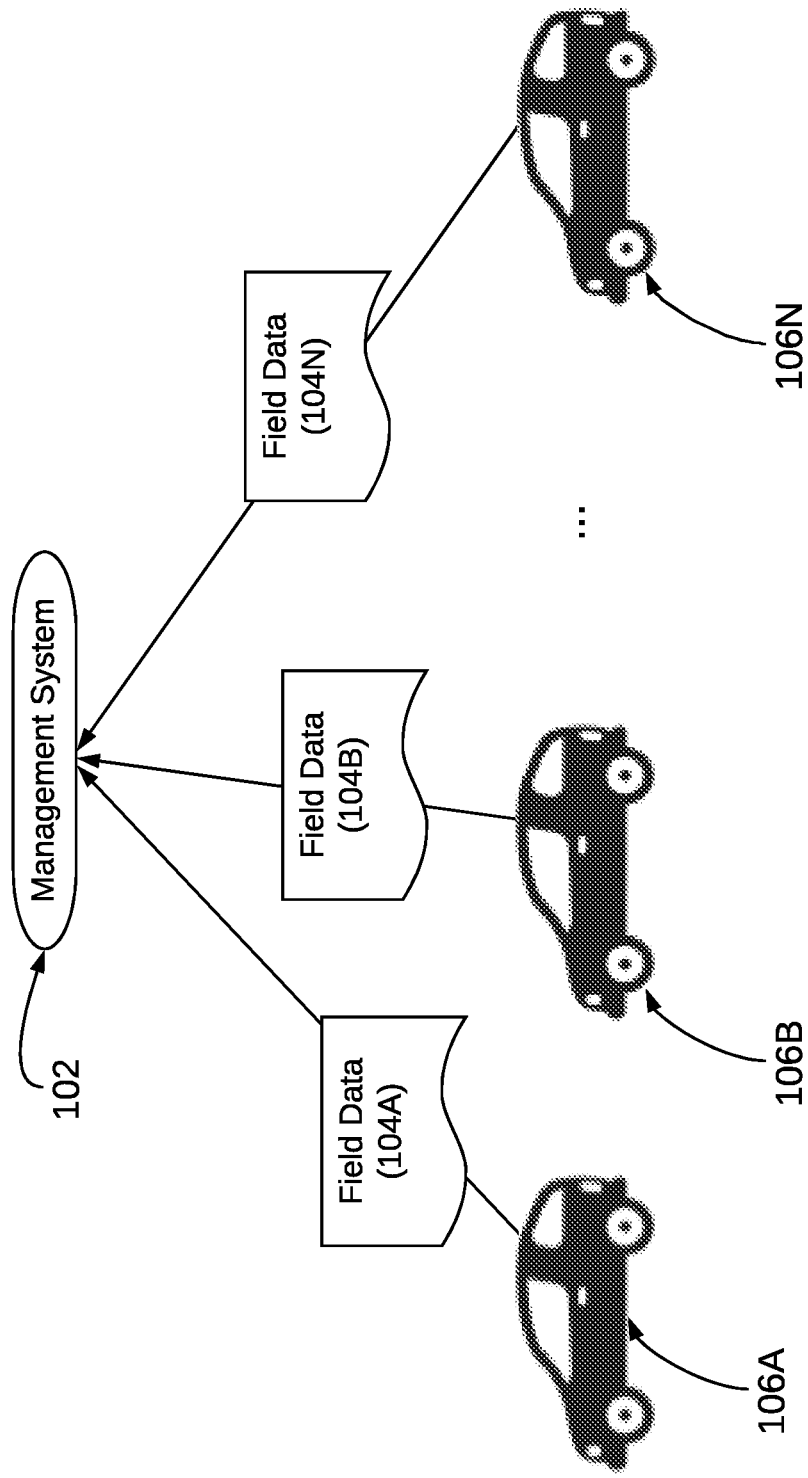
FIG. 1 conceptually illustrates an example management system that can be used to triage work orders using a dynamic priority number, according to some aspects of the disclosed technology.

FIG. 1 conceptually illustrates an example system 100 that can be used to triage work orders using a dynamic priority number, according to some aspects of the disclosed technology. System 100 includes a management system 102 that can be configured to receive field data from one or more machines, e.g., AVs 106. In the example of FIG. 1, the machines 106 are vehicles (e.g., fleet AVs), however, it is understood that machines 106 may include any of a variety of connected machine devices, without departing from the scope of the disclosed technology. By way of example, machines transmitting field data may include, but are not limited to machines used in various other transportation services, such as taxi or trucking fleets. In other examples, field data may be transmitted by vehicles and/or machines deployed in an aviation context, such as airplanes, helicopters, and/or Vertical Take-off and Landing (VTOL) aircraft. By way of further example, machines transmitting field data may include those deployed in a manufacturing context, such as manufacturing plants with parallel robotic processes, and the like.

In practice, management system 102 can be configured to receive field data from various AVs 106, and to identify failure (or potential failure) events, for example, in relation to various mechanical, electrical, and/or software systems on the AV. That is, the field data can include measurements, statistics, and other operational status updates for any of a variety of AV systems.

In some aspects, failure events may be associated with specifically pre-defined issue types. For example, an issue type may include 'computer malfunction,' where the issue is associated with one or more various failure events, such as a GPU temperature fault, mainboard voltage and/or current errors, or power distribution board current interruptions, etc. Depending on the desired implementation, each failure event may be associated with a unique indicator of severity, e.g., a severity score.

In some aspects, the management system 102 may identify failure events (or potential failure events) based on predetermined parameter thresholds for a given event type. For example, a failure event relating to GPU overheating may be identified by the management system 102 if/when a GPU core temperature parameter exceeds a predetermined threshold temperature. By way of further example, failure events (or potential failure events) may be identified with respect to a sensor housing, for example, if a current draw parameter exceeds a given predetermined threshold.

In some aspects, each identified failure event and/or each corresponding issue can be associated with a quantified priority metric, i.e., a dynamic priority number (DPN). In some aspects, the DPN can be associated with a work order to repair the identified failure, and a triage of the work order pipeline can be performed based on DPNs for the various work orders. A more detailed description of an example process for performing work order scheduling based on DPN is discussed in conjunction with FIG. 2A, below.

Figure 2A:
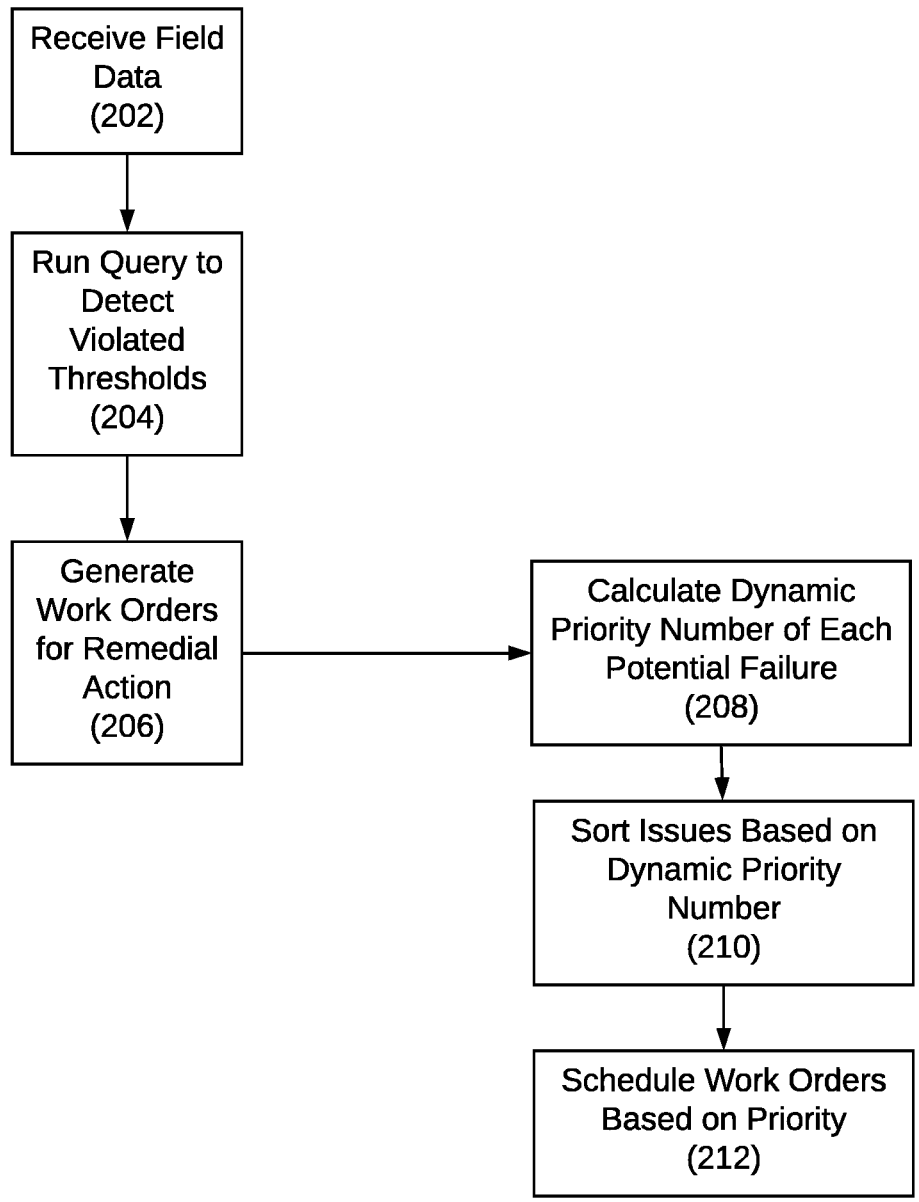
FIG. 2A illustrates an example process that can be implemented by a management system to perform work order scheduling, according to some aspects of the disclosed technology.

FIG. 2A illustrates an example process 200 that can be implemented by a management system to perform work order scheduling. Process 200 begins with block 202 in which field data is received (e.g., by a management system). As discussed above with respect to FIG. 1, the field data can be received from one or more devices/machines (e.g., AVs), and can include any of a variety of reported states/metrics/conditions for one or more corresponding systems or parts. Further to the above example, the field data may include temperature values indicating core temperatures for one or more processing units (such as GPUs) that are operating on one or more AVs.

At block 204, a query is run to identify/detect any violated thresholds. As discussed above, pre-defined parameter thresholds can be used to recognize the occurrence of any potential failure events by filtering the field data for operational anomalies. Further to the foregoing example, predetermined thresholds for GPU core temperatures (indicated in the field data) may be used to identify AV processors operating in high-heat states, and for which a failure event (or future failure event) is likely.

At block 206, work orders for remedial action can be generated. Remedial actions can include requests to initiate pre-established processes, such as those necessary to service/replace parts, or to perform other actions needed to service the reporting machine, such as the reporting vehicle or AV. By way of example, remedial actions may initiate pre-determined procedures for performing brake pad replacements, tire replacements, sensor repairs, and/or a coolant flush, etc.

At block 208, a dynamic priority number (DPN) is calculated for each potential failure event. In some approaches, the dynamic priority number can be a function of one or more various scores/metrics, including but not limited to a severity score, an occurrence likelihood, and/or a confidence score. The severity score can provide a quantitative indication of the overall impact if the issue manifests. By way of example, the severity score may be indicated using a numeric range such as 0 to 10, or 0 to 100; however, it is understood that other score ranges may be used, without departing from the scope of the disclosed technology.

The occurrence can provide a quantitative indication of a percentage of data points where the leading indicator is observed, i.e., a frequency for which the observed failure event is known to occur. By way of example, the occurrence may be indicated on a range of 0-100%. The confidence score can provide a quantitative indication of how strongly the leading indicator correlates with the manifesting issue, e.g., to indicate a strength of correspondence between an observed failure event and the associated issue. By way of example, the confidence can be provided on a numeric range from 0 to 10, or from 0 to 100, etc.

In some aspects, the DPN may also be a function of an occurrence multiplier, e.g., that is calculated based on a ratio of the current occurrence percentage to the last known occurrence percentage. By way of example, if a given car had a 50% occurrence rate today (e.g., 50/100 temperature data points were above threshold), and a 20% occurrence rate yesterday (e.g., 20/100 temperature data points were above threshold), the ratio would be 0.5/0.2 In this manner, the occurrence multiplier can provide a quantitative comparison between two time periods, e.g., a current time period, and a previously measured time period. As such, the occurrence multiplier can function to provide a time derivative indicator for the P.N., e.g., to highlight cases where the issue is trending towards a failure over time. In some approaches, the occurrence multiplier can also help debias against one-off cases where warning thresholds were exceeded. Once DPNs have been calculated for each (potential) failure event, the failure events can be sorted based on immediacy/severity (block 210), and corresponding work orders can be scheduled accordingly (block 212).

Figure 2B:
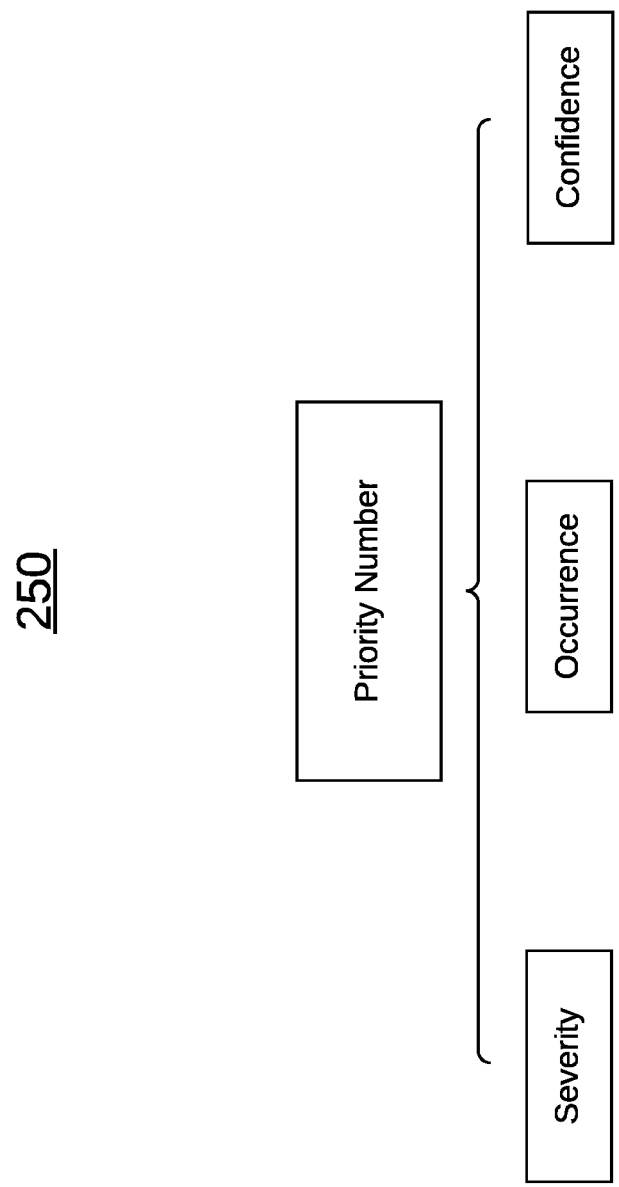
FIG. 2B conceptually illustrates relationship between various failure event characteristics and an assigned priority number, according to some aspects of the disclosed technology.

FIG. 2B conceptually illustrates relationship 250 between various failure event characteristics and an assigned priority number, according to some aspects of the disclosed technology. In some implementations, the priority number can be calculated using the relationship expressed by equation (1):

$$\text{Priority Number (P.N.)} = \text{Severity} \times \text{Occurrence} \times \text{Confidence} \quad (1)$$

where, as discussed above, Severity can be quantified on a numeric scale (e.g., from 0 to 10), Occurrence can be represented as a fraction or percent (e.g., on a scale of 0 to 100%), and Confidence can be quantified on a numeric scales (e.g., 0 to 10). In some aspects, a Dynamic Priority Number (DPN) value can be calculated as a function of the Priority Number (P.N.), for example, using the relationship of equation (2):

$$D.P.N = P.N \times \text{Occurrence Multiplier} = P.N. \times \frac{\text{New Occurrence}}{\text{Last Known Occurrence}} \quad (2)$$

As discussed above with respect to FIG. 2A, work order scheduling can be based on computed DPN metrics for each failure event (or issue).

Figure 3A:
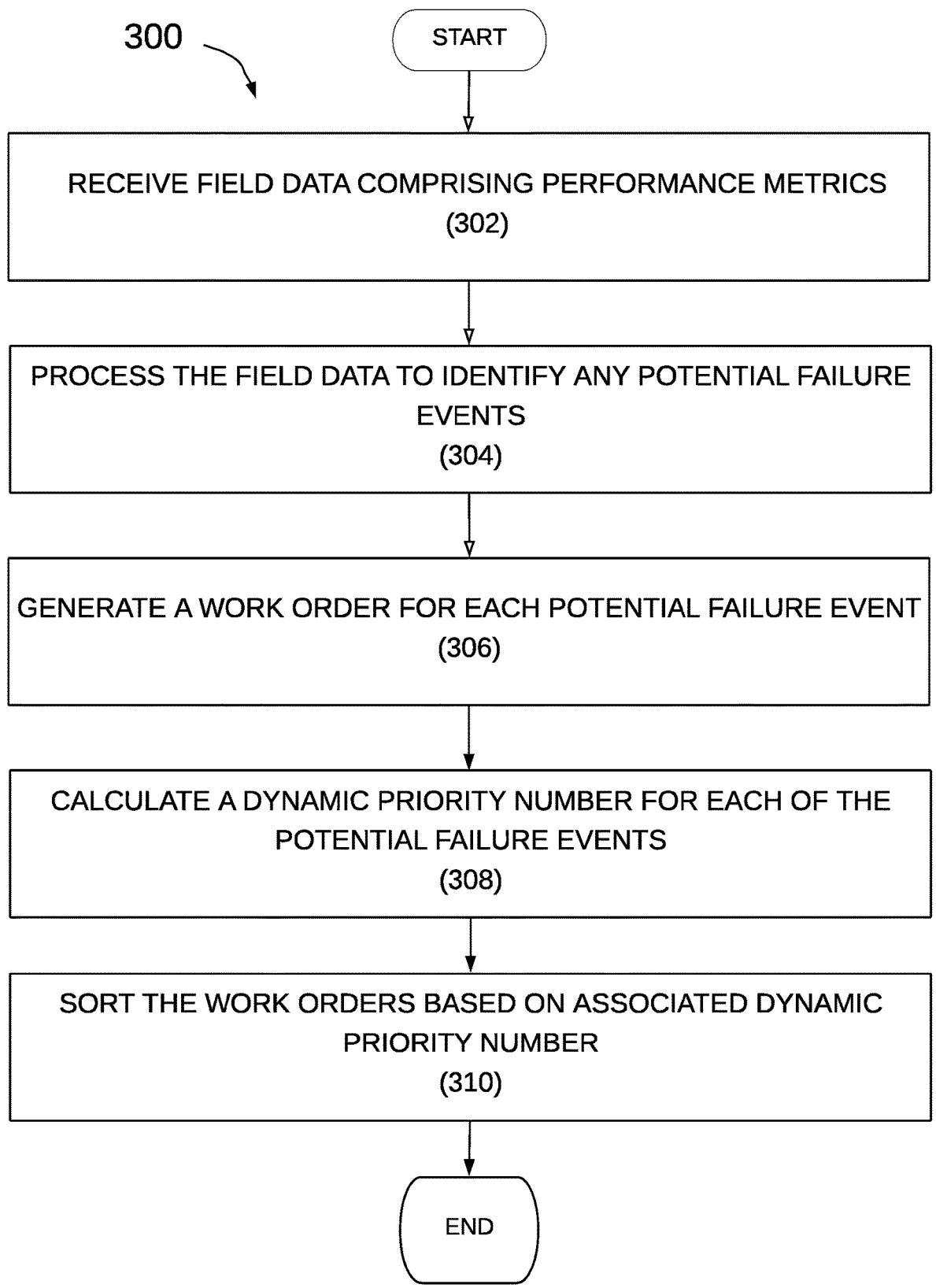
FIG. 3A illustrates a block diagram of an example process for determining a dynamic priority number for various failure events, according to some aspects of the disclosed technology.

FIG. 3A illustrates a block diagram of an example process 300 for determining a dynamic priority number for various failure events. At step 302, process 300 includes receiving field data (e.g., at a management system), wherein the field data includes performance metrics associated with one or more devices or machines, such as one or more autonomous vehicles (AVs). In some aspects, the AVs may belong to an AV fleet. In such instances, the management system may be configured to manage/triage workflows to facilitate the maintenance of the AV fleet.

At step 304, the process 300 includes processing the field data to identify two or more potential failure events associated with at least one AV from among the one or more AVs. As discussed above, identification of failure events (or potential failure events) can be performed by comparing variously reported metric information to associated predetermined thresholds. By way of example, GPU temperatures may be compared to predetermined temperature thresholds, above which, GPU malfunctions are likely to occur; tire pressure metrics may be compared to predetermined pressure thresholds, above which, tire problems are likely to occur; and motor controller measurements of current may be compared to predetermined current thresholds, above which, motor/assembly failures are likely to persist, etc. It is understood that the field data can contain virtually any information (or metadata) indicating various states, measurements, and/or diagnostics of various mechanical, electrical, software and/or firmware modules of the corresponding device (e.g., the corresponding AV or AV system). In step 306, the process 300 includes generating a work order for each potential failure event.

In step 308, the process 300 includes calculating a dynamic priority number for each of the potential failure events. The DPN calculation may include separate determinations/calculations of a Priority Number (P.N.), and Occurrence Multiplier, as discussed above with respect to equations (1) and (2). In step 310, the process 300 includes sorting (triaging) work orders for each of the associated failure events, e.g., based on their respectively associated DPN values.

Figure 3B:
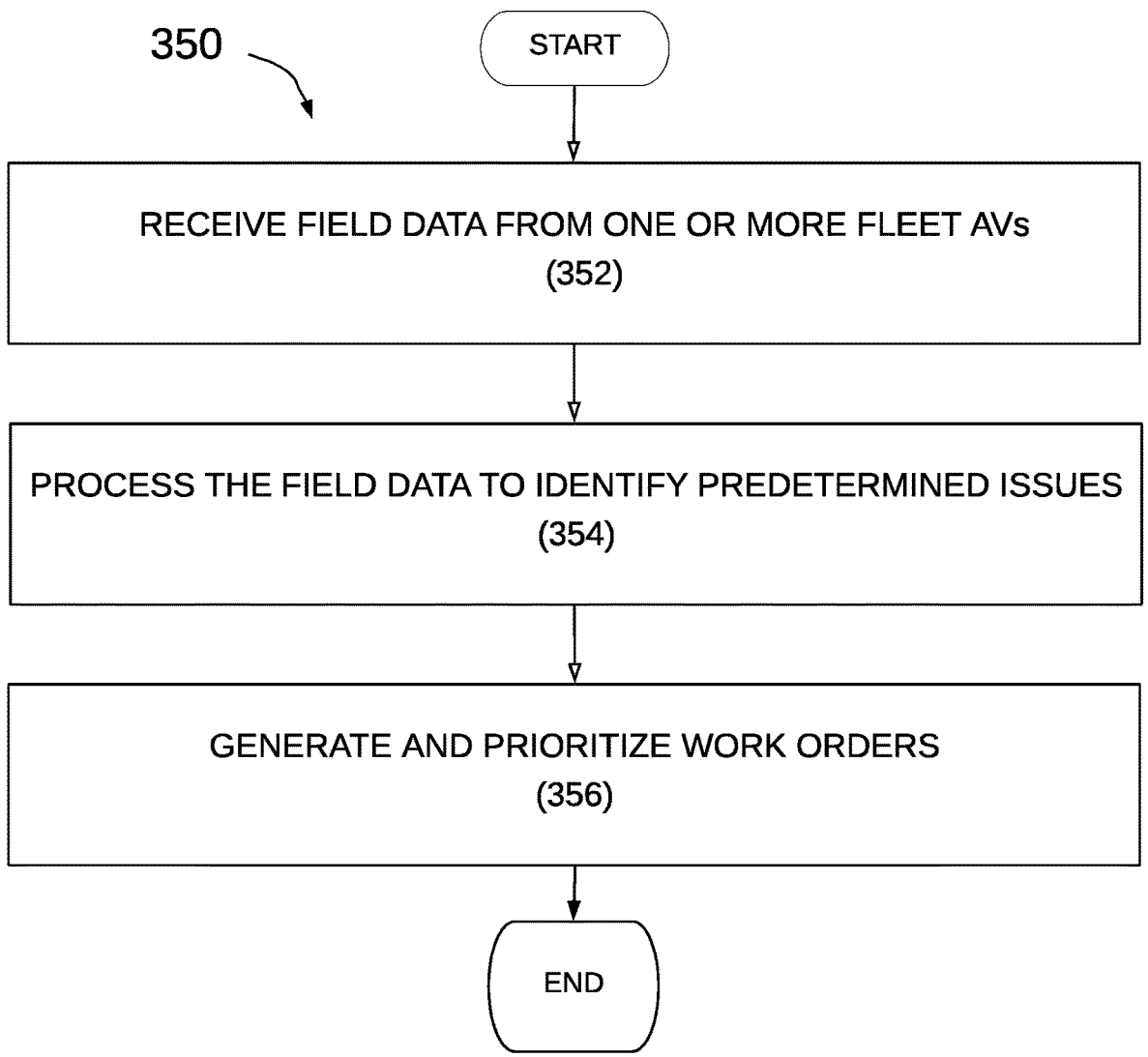
FIG. 3B illustrates a block diagram of an example process for prioritizing work orders relating to autonomous vehicle (AV) repairs, according to some aspects of the disclosed technology.

FIG. 3B illustrates a block diagram of an example process 350 for prioritizing work orders relating to autonomous vehicle (AV) repairs. Process 350 begins with step 352 in which field data is received from one or more AVs, such as an AV in an AV fleet, e.g., any of AVs 106 as discussed above with respect to FIG. 1. The field data can include various measurements and/or metrics pertaining to AV systems or components. By way of example, the field data can include temperature measurement data that indicates core temperatures for various processing units, such as CPUs and/or GPUs for various computing systems of the respective AV. In some aspects, the field data can include a series of measurements, such as time-series temperature data for a given component, e.g., a GPU. In some aspects, the field data can include data for specifically selected or identified components (e.g., GPUs) for example, that are associated with different supporting components, such as different liquid cooling systems.

At step 354, the process 350 can include steps for processing the field data to identify any predetermined issues associated with the type of received field data. By way of example, temperature measures for various processors on the AV may be indicative of certain malfunction types (issues). For example, high GPU temperatures may indicate component malfunctions with respect to a processor (e.g., a GPU), and/or associated components or systems, such as a cooling system that includes a liquid cooling apparatus.

By way of example, GPU temperatures may be measured/monitored to detect when temperature differences between two or more GPUs exceed a predetermined threshold, or when the temperature of a given GPU exceeds a predetermined safe-stop threshold. In some examples, differences between GPU core temperatures may indicate a malfunction for cooling equipment, such as the malfunction of a liquid cooling system, for example that is caused by the formation of air bubbles in one or more portions of the cooling system. In some instances, temperature measurements may be used to infer the malfunction or failure of a given GPU. For example, if GPU temperatures exceed a pre-determined threshold or safe-stop limit (e.g., 72C), it may be determined that there is an issue with the GPU. As such, the determined/identified issue for a given component (or collection of components) can be based on measurements that are reported in field data for multiple components/systems (e.g., by taking consideration of measurement differences) and/or for single measurements (e.g., taking consideration of thresholds or safe-stop limits for the given component).

In step 356, the process 350 can include the generation and prioritization of work orders to ensure that the identified issue is timely serviced. As discussed above with respect to equations (1) and (2), the field data can be used to compute priority metrics, such as a priority number and/or a dynamic priority number. As discussed above, the priority can be based on the issue type. For example, if the malfunction is due to a problem intrinsic to the GPU, then the computed priority metric may indicate a greater urgency, which can be reflected in the work order priority (e.g., a higher priority). However, if the malfunction is likely to be one relating to a cooling component, such as a heat-sink or cooling fan, then the computed priority metric may indicate a lower urgency, e.g., a lower work order priority.

Figure 4:
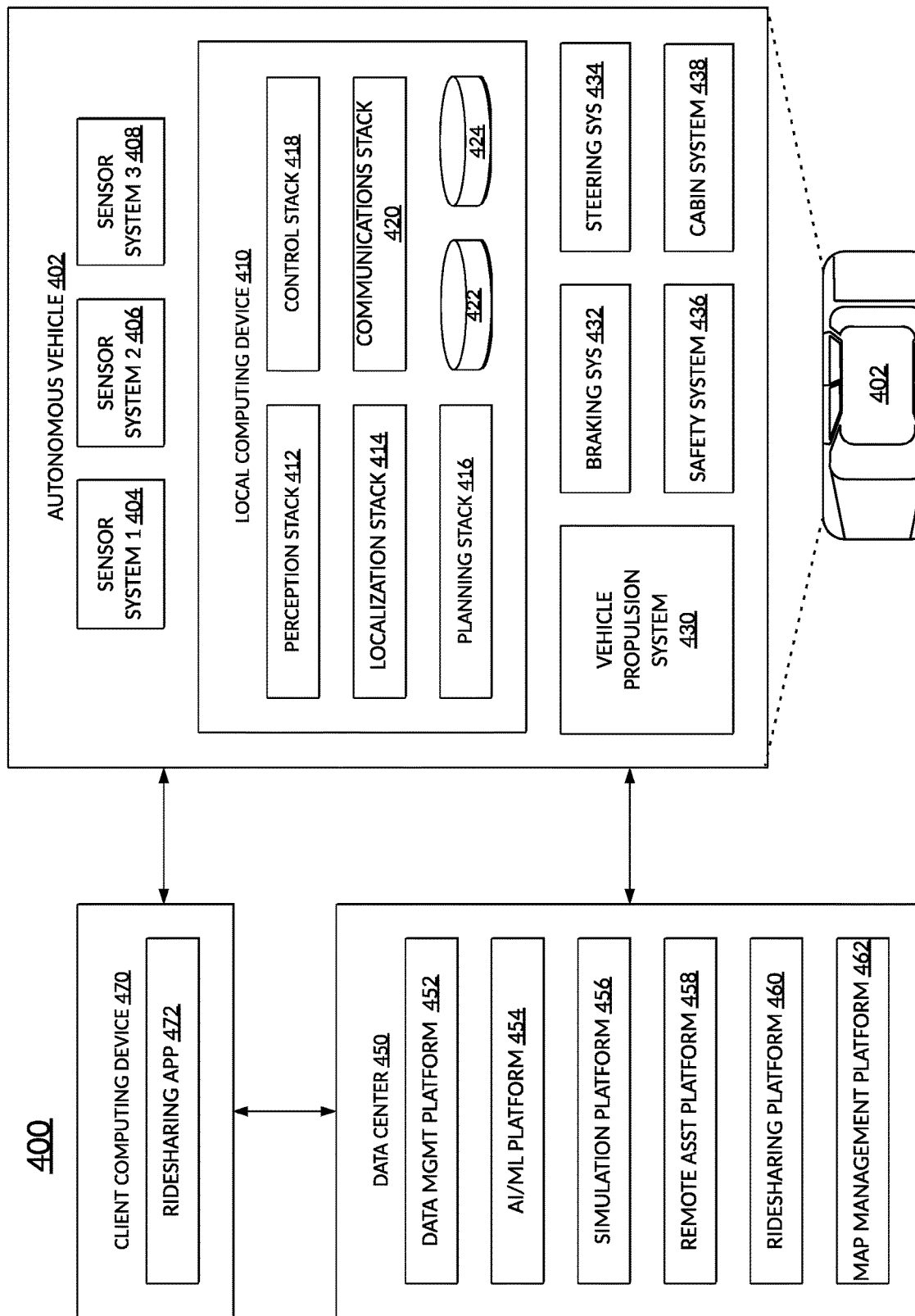
FIG. 4 illustrates an example system environment that can be used to facilitate AV dispatch and operations, according to some aspects of the disclosed technology.

Turning now to FIG. 4 illustrates an example of an AV management system 500. One of ordinary skill in the art will understand that, for the AV management system 400 and any system discussed in the present disclosure, there can be additional or fewer components in similar or alternative configurations. The illustrations and examples provided in the present disclosure are for conciseness and clarity. Other embodiments may include different numbers and/or types of elements, but one of ordinary skill the art will appreciate that such variations do not depart from the scope of the present disclosure.

In this example, the AV management system 400 includes an AV 402, a data center 450, and a client computing device 470. The AV 402, the data center 450, and the client computing device 470 can communicate with one another over one or more networks (not shown), such as a public network (e.g., the Internet, an Infrastructure as a Service (IaaS) network, a Platform as a Service (PaaS) network, a Software as a Service (SaaS) network, other Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

AV 402 can navigate about roadways without a human driver based on sensor signals generated by multiple sensor systems 404, 406, and 408. The sensor systems 404-408 can include different types of sensors and can be arranged about the AV 402. For instance, the sensor systems 404-408 can comprise Inertial Measurement Units (IMUs), cameras (e.g., still image cameras, video cameras, etc.), light sensors (e.g., LIDAR systems, ambient light sensors, infrared sensors, etc.), RADAR systems, GPS receivers, audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 404 can be a camera system, the sensor system 406 can be a LIDAR system, and the sensor system 408 can be a RADAR system. Other embodiments may include any other number and type of sensors.

AV 402 can also include several mechanical systems that can be used to maneuver or operate AV 402. For instance, the mechanical systems can include vehicle propulsion system 430, braking system 432, steering system 434, safety system 436, and cabin system 438, among other systems. Vehicle propulsion system 430 can include an electric motor, an internal combustion engine, or both. The braking system 432 can include an engine brake, brake pads, actuators, and/or any other suitable componentry configured to assist in decelerating AV 402. The steering system 434 can include suitable componentry configured to control the direction of movement of the AV 402 during navigation. Safety system 436 can include lights and signal indicators, a parking brake, airbags, and so forth. The cabin system 438 can include cabin temperature control systems, in-cabin entertainment systems, and so forth. In some embodiments, the AV 402 may not include human driver actuators (e.g., steering wheel, handbrake, foot brake pedal, foot accelerator pedal, turn signal lever, window wipers, etc.) for controlling the AV 402. Instead, the cabin system 438 can include one or more client interfaces (e.g., Graphical User Interfaces (GUIs), Voice User Interfaces (VUIs), etc.) for controlling certain aspects of the mechanical systems 430-438.

AV 402 can additionally include a local computing device 410 that is in communication with the sensor systems 404-408, the mechanical systems 430-438, the data center 450, and the client computing device 470, among other systems. The local computing device 410 can include one or more processors and memory, including instructions that can be executed by the one or more processors. The instructions can make up one or more software stacks or components responsible for controlling the AV 402; communicating with the data center 450, the client computing device 470, and other systems; receiving inputs from riders, passengers, and other entities within the AV's environment; logging metrics collected by the sensor systems 404-408; and so forth. In this example, the local computing device 410 includes a perception stack 412, a mapping and localization stack 414, a planning stack 416, a control stack 418, a communications stack 420, an HD geospatial database 422, and an AV operational database 424, among other stacks and systems.

Perception stack 412 can enable the AV 402 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 404-408, the mapping and localization stack 414, the HD geospatial database 422, other components of the AV, and other data sources (e.g., the data center 450, the client computing device 470, third-party data sources, etc.). The perception stack 412 can detect and classify objects and determine their current and predicted locations, speeds, directions, and the like. In addition, the perception stack 412 can determine the free space around the AV 402 (e.g., to maintain a safe distance from other objects, change lanes, park the AV, etc.). The perception stack 412 can also identify environmental uncertainties, such as where to look for moving objects, flag areas that may be obscured or blocked from view, and so forth.

Mapping and localization stack 414 can determine the AV's position and orientation (pose) using different methods from multiple systems (e.g., GPS, IMUs, cameras, LIDAR, RADAR, ultrasonic sensors, the HD geospatial database 422, etc.). For example, in some embodiments, the AV 402 can compare sensor data captured in real-time by the sensor systems 404-408 to data in the HD geospatial database 422 to determine its precise (e.g., accurate to the order of a few centimeters or less) position and orientation. The AV 402 can focus its search based on sensor data from one or more first sensor systems (e.g., GPS) by matching sensor data from one or more second sensor systems (e.g., LIDAR). If the mapping and localization information from one system is unavailable, the AV 402 can use mapping and localization information from a redundant system and/or from remote data sources.

The planning stack 416 can determine how to maneuver or operate the AV 402 safely and efficiently in its environment. For example, the planning stack 416 can receive the location, speed, and direction of the AV 402, geospatial data, data regarding objects sharing the road with the AV 402 (e.g., pedestrians, bicycles, vehicles, ambulances, buses, cable cars, trains, traffic lights, lanes, road markings, etc.) or certain events occurring during a trip (e.g., emergency vehicle blaring a siren, intersections, occluded areas, street closures for construction or street repairs, double-parked cars, etc.), traffic rules and other safety standards or practices for the road, user input, and other relevant data for directing the AV 402 from one point to another. The planning stack 416 can determine multiple sets of one or more mechanical operations that the AV 402 can perform (e.g., go straight at a specified rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 416 can select from multiple backup plans to carry out. For example, while preparing to change lanes to turn right at an intersection, another vehicle may aggressively cut into the destination lane, making the lane change unsafe. The planning stack 416 could have already determined an alternative plan for such an event, and upon its occurrence, help to direct the AV 402 to go around the block instead of blocking a current lane while waiting for an opening to change lanes.

The control stack 418 can manage the operation of the vehicle propulsion system 430, the braking system 432, the steering system 434, the safety system 436, and the cabin system 438. The control stack 418 can receive sensor signals from the sensor systems 404-408 as well as communicate with other stacks or components of the local computing device 410 or a remote system (e.g., the data center 450) to effectuate operation of the AV 402. For example, the control stack 418 can implement the final path or actions from the multiple paths or actions provided by the planning stack 416. This can involve turning the routes and decisions from the planning stack 416 into commands for the actuators that control the AV's steering, throttle, brake, and drive unit.

The communication stack 420 can transmit and receive signals between the various stacks and other components of the AV 402 and between the AV 402, the data center 450, the client computing device 470, and other remote systems. The communication stack 420 can enable the local computing device 410 to exchange information remotely over a network, such as through an antenna array or interface that can provide a metropolitan WIFI network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communication stack 420 can also facilitate local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 422 can store HD maps and related data of the streets upon which the AV 402 travels. In some embodiments, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane centerline, lane boundaries, type of lane boundaries, etc.) and related attributes (e.g., direction of travel, speed limit, lane type, etc.). The lanes and boundaries layer can also include 3D attributes related to lanes (e.g., slope, elevation, curvature, etc.). The intersections layer can include geospatial information of intersections (e.g., crosswalks, stop lines, turning lane centerlines and/or boundaries, etc.) and related attributes (e.g., permissive, protected/permissive, or protected only left turn lanes; legal or illegal U-turn lanes; permissive or protected only right turn lanes; etc.). The traffic controls lane can include geospatial information of traffic signal lights, traffic signs, and other road objects and related attributes.

The AV operational database 424 can store raw AV data generated by the sensor systems 404-408 and other components of the AV 402 and/or data received by the AV 402 from remote systems (e.g., the data center 450, the client computing device 470, etc.). In some embodiments, the raw AV data can include HD LIDAR point cloud data, image data, RADAR data, GPS data, and other sensor data that the data center 450 can use for creating or updating AV geospatial data as discussed further below with respect to FIG. 2 and elsewhere in the present disclosure.

The data center 450 can be a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and so forth. The data center 450 can include one or more computing devices remote to the local computing device 410 for managing a fleet of AVs and AV-related services. For example, in addition to managing the AV 402, the data center 450 may also support a ridesharing service, a delivery service, a remote/roadside assistance service, street services (e.g., street mapping, street patrol, street cleaning, street metering, parking reservation, etc.), and the like.

The data center 450 can send and receive various signals to and from the AV 402 and client computing device 470. These signals can include sensor data captured by the sensor systems 404-408, roadside assistance requests, software updates, ridesharing pick-up and drop-off instructions, and so forth. In this example, the data center 450 includes a data management platform 452, an Artificial Intelligence/Machine Learning (AI/ML) platform 454, a simulation platform 456, a remote assistance platform 458, a ridesharing platform 460, and map management system platform 462, among other systems.

Data management platform 452 can be a "big data" system capable of receiving and transmitting data at high velocities (e.g., near real-time or real-time), processing a large variety of data, and storing large volumes of data (e.g., terabytes, petabytes, or more of data). The varieties of data can include data having different structure (e.g., structured, semi-structured, unstructured, etc.), data of different types (e.g., sensor data, mechanical system data, ridesharing service, map data, audio, video, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of the data center 450 can access data stored by the data management platform 452 to provide their respective services.

The AI/ML platform 454 can provide the infrastructure for training and evaluating machine learning algorithms for operating the AV 402, the simulation platform 456, the remote assistance platform 458, the ridesharing platform 460, the map management system platform 462, and other platforms and systems. Using the AI/ML platform 454, data scientists can prepare data sets from the data management platform 452; select, design, and train machine learning models; evaluate, refine, and deploy the models; maintain, monitor, and retrain the models; and so on.

The simulation platform 456 can enable testing and validation of the algorithms, machine learning models, neural networks, and other development efforts for the AV 402, the remote assistance platform 458, the ridesharing platform 460, the map management system platform 462, and other platforms and systems. The simulation platform 456 can replicate a variety of driving environments and/or reproduce real-world scenarios from data captured by the AV 402, including rendering geospatial information and road infrastructure (e.g., streets, lanes, crosswalks, traffic lights, stop signs, etc.) obtained from the map management system platform 462; modeling the behavior of other vehicles, bicycles, pedestrians, and other dynamic elements; simulating inclement weather conditions, different traffic scenarios; and so on.

The remote assistance platform 458 can generate and transmit instructions regarding the operation of the AV 402. For example, in response to an output of the AI/ML platform 454 or other system of the data center 450, the remote assistance platform 458 can prepare instructions for one or more stacks or other components of the AV 402.

The ridesharing platform 460 can interact with a customer of a ridesharing service via a ridesharing application 472 executing on the client computing device 470. The client computing device 470 can be any type of computing system, including a server, desktop computer, laptop, tablet, smartphone, smart wearable device (e.g., smart watch, smart eyeglasses or other Head-Mounted Display (HMD), smart ear pods or other smart in-ear, on-ear, or over-ear device, etc.), gaming system, or other general purpose computing device for accessing the ridesharing application 472. The client computing device 470 can be a customer's mobile computing device or a computing device integrated with the AV 402 (e.g., the local computing device 410). The ridesharing platform 460 can receive requests to be picked up or dropped off from the ridesharing application 472 and dispatch the AV 402 for the trip.

Map management system platform 462 can provide a set of tools for the manipulation and management of geographic and spatial (geospatial) and related attribute data. The data management platform 452 can receive LIDAR point cloud data, image data (e.g., still image, video, etc.), RADAR data, GPS data, and other sensor data (e.g., raw data) from one or more AVs 402, UAVs, satellites, third-party mapping services, and other sources of geospatially referenced data. The raw data can be processed, and map management system platform 462 can render base representations (e.g., tiles (2D), bounding volumes (3D), etc.) of the AV geospatial data to enable users to view, query, label, edit, and otherwise interact with the data. Map management system platform 462 can manage workflows and tasks for operating on the AV geospatial data. Map management system platform 462 can control access to the AV geospatial data, including granting or limiting access to the AV geospatial data based on user-based, role-based, group-based, task-based, and other attribute-based access control mechanisms. Map management system platform 462 can provide version control for the AV geospatial data, such as to track specific changes that (human or machine) map editors have made to the data and to revert changes when necessary. Map management system platform 462 can administer release management of the AV geospatial data, including distributing suitable iterations of the data to different users, computing devices, AVs, and other consumers of HD maps. Map management system platform 462 can provide analytics regarding the AV geospatial data and related data, such as to generate insights relating to the throughput and quality of mapping tasks.

In some embodiments, the map viewing services of map management system platform 462 can be modularized and deployed as part of one or more of the platforms and systems of the data center 450. For example, the AI/ML platform 454 may incorporate the map viewing services for visualizing the effectiveness of various object detection or object classification models, the simulation platform 456 may incorporate the map viewing services for recreating and visualizing certain driving scenarios, the remote assistance platform 458 may incorporate the map viewing services for replaying traffic incidents to facilitate and coordinate aid, the ridesharing platform 460 may incorporate the map viewing services into the client application 472 to enable passengers to view the AV 402 in transit en route to a pick-up or drop-off location, and so on.

Figure 5:
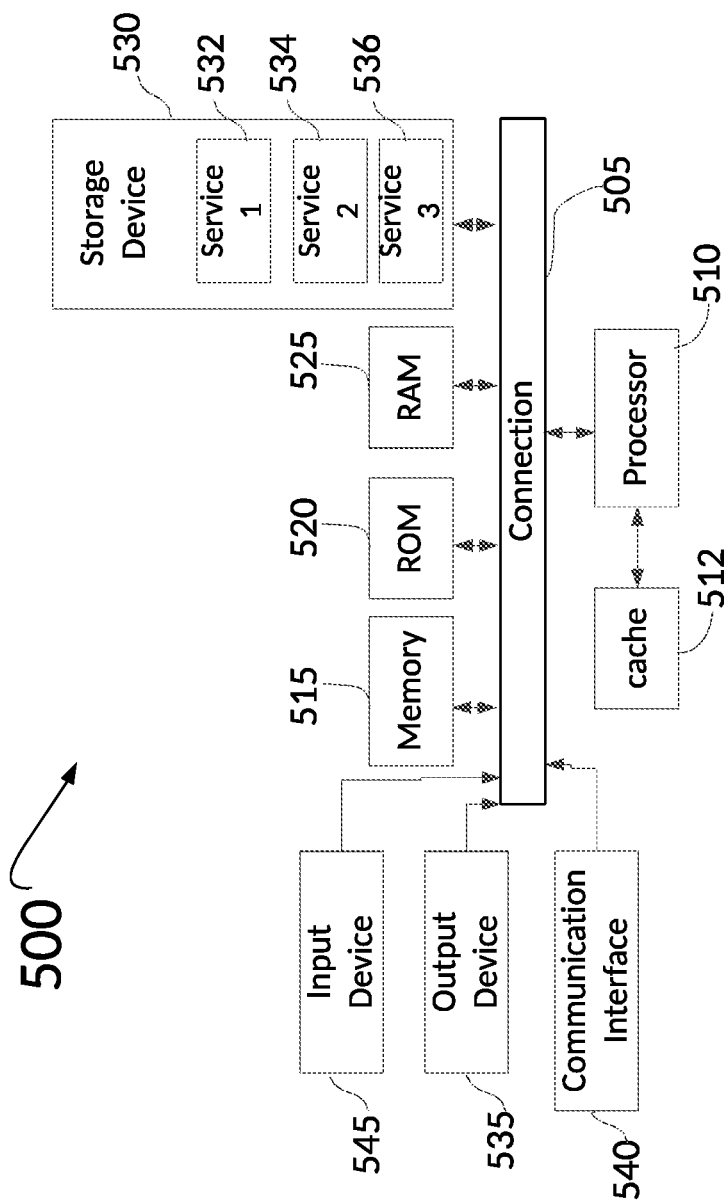
FIG. 5 illustrates an example processor-based system with which some aspects of the subject technology can be implemented.

FIG. 5 illustrates an example processor-based system with which some aspects of the subject technology can be implemented. For example, processor-based system 500 can be any computing device making up internal computing system 510, remote computing system 550, a passenger device executing the rideshare app 570, internal computing device 530, or any component thereof in which the components of the system are in communication with each other using connection 505. Connection 505 can be a physical connection via a bus, or a direct connection into processor 510, such as in a chipset architecture. Connection 505 can also be a virtual connection, networked connection, or logical connection.

In some embodiments, computing system 500 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 500 includes at least one processing unit (CPU or processor) 510 and connection 505 that couples various system components including system memory 515, such as read-only memory (ROM) 520 and random-access memory (RAM) 525 to processor 510. Computing system 500 can include a cache of high-speed memory 512 connected directly with, in close proximity to, or integrated as part of processor 510.

Processor 510 can include any general-purpose processor and a hardware service or software service, such as services 532, 534, and 536 stored in storage device 530, configured to control processor 510 as well as a special-purpose processor where software instructions are incorporated into the actual processor design. Processor 510 may essentially be a completely self-contained computing system, containing multiple cores or processors, a bus, memory controller, cache, etc. A multi-core processor may be symmetric or asymmetric.

To enable user interaction, computing system 500 includes an input device 545, which can represent any number of input mechanisms, such as a microphone for speech, a touch-sensitive screen for gesture or graphical input, keyboard, mouse, motion input, speech, etc. Computing system 500 can also include output device 535, which can be one or more of a number of output mechanisms known to those of skill in the art. In some instances, multimodal systems can enable a user to provide multiple types of input/output to communicate with computing system 500. Computing system 500 can include communications interface 540, which can generally govern and manage the user input and system output. The communication interface may perform or facilitate receipt and/or transmission wired or wireless communications via wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

Communication interface 540 may also include one or more Global Navigation Satellite System (GNSS) receivers or transceivers that are used to determine a location of the computing system 500 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 530 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L#), resistive random-access memory (RRAM/ReRAM), phase change memory (PCM), spin transfer torque RAM (STT-RAM), another memory chip or cartridge, and/or a combination thereof.

Storage device 530 can include software services, servers, services, etc., that when the code that defines such software is executed by the processor 510, it causes the system to perform a function. In some embodiments, a hardware service that performs a particular function can include the software component stored in a computer-readable medium in connection with the necessary hardware components, such as processor 510, connection 505, output device 535, etc., to carry out the function.

As understood by those of skill in the art, machine-learning based classification techniques can vary depending on the desired implementation. For example, machine-learning classification schemes can utilize one or more of the following, alone or in combination: hidden Markov models; recurrent neural networks; convolutional neural networks (CNNs); deep learning; Bayesian symbolic methods; general adversarial networks (GANs); support vector machines; image registration methods; applicable rule-based system. Where regression algorithms are used, they may include including but are not limited to: a Stochastic Gradient Descent Regressor, and/or a Passive Aggressive Regressor, etc.

Machine learning classification models can also be based on clustering algorithms (e.g., a Mini-batch K-means clustering algorithm), a recommendation algorithm (e.g., a Miniwise Hashing algorithm, or Euclidean Locality-Sensitive Hashing (LSH) algorithm), and/or an anomaly detection algorithm, such as a Local outlier factor. Additionally, machine-learning models can employ a dimensionality reduction approach, such as, one or more of: a Mini-batch Dictionary Learning algorithm, an Incremental Principal Component Analysis (PCA) algorithm, a Latent Dirichlet Allocation algorithm, and/or a Mini-batch K-means algorithm, etc.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

What is claimed is:

1. An apparatus, comprising:
   at least one memory; and at least one processor coupled to the at least one memory, the at least one processor configured to:
receive one or more measurements from an autonomous vehicle (AV), wherein the one or more measurements include at least one of a graphics processing unit (GPU) temperature, a tire pressure, and an electric current of an electric motor;
identify a potential failure event associated with the AV based on the one or more measurements and at least one threshold associated with the one or more measurements;
automatically generate a work order for servicing the potential failure event associated with the AV;
determine a priority number for the potential failure event, wherein the priority number is indicative of an urgency associated with the potential failure event;
calculate a dynamic priority number for the potential failure event that is based on the priority number and an occurrence multiplier, wherein the occurrence multiplier is indicative of a failure trend over time for the potential failure event;
sort the work order for servicing the potential failure event based on the dynamic priority number relative to one or more dynamic priority numbers of work orders associated with a fleet of AVs; and
send at least one routing instruction to the AV, wherein the at least one routing instruction directs the AV to autonomously navigate to a facility for completion of the work order.

2. The apparatus of claim 1, wherein the at least one processor is configured to:
receive a first metric of a first computing system component of an additional AV of the fleet of AVs and a second metric of a second computing system component of the additional AV, wherein the first metric and the second metric are determined using one or more sensors;
identify an additional potential failure event associated with the additional AV based on a difference between the first metric of the first computing system component of the AV and the second metric of the second computing system component of the AV; and
determine an additional dynamic priority number for the additional potential failure event, wherein the one or more dynamic priority numbers comprise the additional dynamic priority number.

3. The apparatus of claim 2, wherein the first metric comprises a first temperature and the first computing system component comprises a first processing component, wherein the second metric comprises a second temperature and the second computing system component comprises a second processing component, and wherein identifying the additional potential failure event comprises determining the additional potential failure event based on the difference between the first temperature of the first processing component and the second temperature of the second processing component.

4. The apparatus of claim 1, wherein the priority number for the potential failure event is based on a corresponding severity score for the potential failure event.

5. The apparatus of claim 1, wherein the priority number for the potential failure event is based on a corresponding occurrence probability for the potential failure event.

6. The apparatus of claim 1, wherein the priority number for the potential failure event is based on a corresponding confidence score for the potential failure event.

7. The apparatus of claim 1, wherein the occurrence multiplier is a ratio of a current occurrence rate associated with the potential failure event and a previous occurrence rate associated with the potential failure event.

8. A computer-implemented method, comprising:
receiving one or more measurements from an autonomous vehicle (AV), wherein the one or more measurements include at least one of a graphics processing unit (GPU) temperature, a tire pressure, and an electric current of an electric motor;
identifying a potential failure event associated with the AV based on the one or more measurements and at least one threshold associated with the one or more measurements;
generating a work order for servicing the potential failure event associated with the AV;
determining a priority number for the potential failure event, wherein the priority number is indicative of an urgency associated with the potential failure event;
calculating a dynamic priority number for the potential failure event that is based on the priority number and an occurrence multiplier, wherein the occurrence multiplier is indicative of a failure trend over time for the potential failure event;
sorting the work order for servicing the potential failure event based on the dynamic priority number relative to one or more dynamic priority numbers of work orders associated with a fleet of Avs; and
sending at least one routing instruction to the AV, wherein the at least one routing instruction directs the AV to autonomously navigate to a facility for completion of the work order.

9. The computer-implemented method of claim 8, further comprising:
receiving a first metric of a first computing system component of an additional AV of the fleet of AVs and a second metric of a second computing system component of the additional AV, wherein the first metric and the second metric are determined using one or more sensors;
identifying an additional potential failure event associated with the additional AV based on a difference between the first metric of the first computing system component of the AV and the second metric of the second computing system component of the AV; and
determining an additional dynamic priority number for the additional potential failure event, wherein the one or more dynamic priority numbers comprise the additional dynamic priority number.

10. The computer-implemented method of claim 9, wherein the first metric comprises a first temperature and the first computing system component comprises a first processing component, wherein the second metric comprises a second temperature and the second computing system component comprises a second processing component, and wherein identifying the additional potential failure event comprises determining the additional potential failure event based on the difference between the first temperature of the first processing component and the second temperature of the second processing component.

11. The computer-implemented method of claim 8, wherein the priority number for the potential failure event is based on a corresponding severity score for the potential failure event.

12. The computer-implemented method of claim 8, wherein the priority number for the potential failure event is based on a corresponding occurrence probability for the potential failure event.

13. The computer-implemented method of claim 8, wherein the priority number for the potential failure event is based on a corresponding confidence score for the potential failure event.

14. The computer-implemented method of claim 8, wherein the occurrence multiplier is a ratio of a current occurrence rate associated with the potential failure event and a previous occurrence rate associated with the potential failure event.

15. A non-transitory computer-readable storage medium comprising at least one instruction for causing a computer or processor to:
receive one or more measurements from an autonomous vehicle (AV), wherein the one or more measurements include at least one of a graphics processing unit (GPU) temperature, a tire pressure, and an electric current of an electric motor;
identify a potential failure event associated with the AV based on the one or more measurements and at least one threshold associated with the one or more measurements;
automatically generate a work order for servicing the potential failure event associated with the AV;
determine a priority number for the potential failure event, wherein the priority number is indicative of an urgency associated with the potential failure event;
calculate a priority number for the potential failure event that is based on the priority number and an occurrence multiplier, wherein the occurrence multiplier is indicative of a failure trend over time for the potential failure event;
sort the work order for servicing the potential failure event based on the priority number relative to one or more priority numbers of work orders associated with a fleet of Avs; and
send at least one routing instruction to the AV, wherein the at least one routing instruction directs the AV to autonomously navigate to a facility for completion of the work order.

16. The non-transitory computer-readable storage medium of claim 15, wherein further comprising instructions for causing the computer or processor to:
receive a first metric of a first computing system component of an additional AV of the fleet of AVs and a second metric of a second computing system component of the additional AV, wherein the first metric and the second metric are determined using one or more sensors;
identify an additional potential failure event associated with the additional AV based on a difference between the first metric of the first computing system component of the AV and the second metric of the second computing system component of the AV; and
determine an additional priority number for the additional potential failure event, wherein the one or more priority numbers comprise the additional priority number.

17. The non-transitory computer-readable storage medium of claim 16, wherein the first metric comprises a first temperature and the first computing system component comprises a first processing component, wherein the second metric comprises a second temperature and the second computing system component comprises a second processing component, and wherein identifying the additional potential failure event comprises determining the additional potential failure event based on the difference between the first temperature of the first processing component and the second temperature of the second processing component.

18. The non-transitory computer-readable storage medium of claim 15, wherein the priority number for the potential failure event is based on a corresponding severity score for the potential failure event.

19. The non-transitory computer-readable storage medium of claim 15, wherein the priority number for the potential failure event is based on a corresponding occurrence probability for the potential failure event.

20. The non-transitory computer-readable storage medium of claim 15, wherein the priority number for the potential failure event is based on a corresponding confidence score for the potential failure event.

* * * * *